(12) United States Patent
Ikegami (10) Patent No.: US 8,065,625 B2
(45) Date of Patent: Nov. 22, 2011

(54) GUI EVALUATION SYSTEM, GUI EVALUATION METHOD, AND GUI EVALUATION PROGRAM

(75) Inventor: Teruya Ikegami, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/120,160

(22) PCT Filed: Aug. 7, 2009

(86) PCT No.: PCT/JP2009/003825
§ 371 (c)(1),
(2), (4) Date: Mar. 22, 2011

(87) PCT Pub. No.: WO2010/035388
PCT Pub. Date: Apr. 1, 2010

(65) Prior Publication Data
US 2011/0173561 A1 Jul. 14, 2011

(30) Foreign Application Priority Data
Sep. 29, 2008 (JP) ................................. 2008-251808

(51) Int. Cl.
*G06F 3/048* (2006.01)
*G06F 17/00* (2006.01)
(52) U.S. Cl. ......... 715/780; 715/764; 715/224; 715/244
(58) Field of Classification Search .................. 715/780, 715/764, 224–226, 244, 243
See application file for complete search history.

(56) References Cited

U.S. PATENT DOCUMENTS
7,836,407 B2 * 11/2010 Pettinati .................. 715/780

2003/0160828 A1 * 8/2003 Treibach-Heck et al. .... 345/780
2006/0224990 A1 * 10/2006 Treibach-Heck et al. .... 715/780

FOREIGN PATENT DOCUMENTS
| JP | 8-241191 | 9/1996 |
| JP | 9-231036 | 9/1997 |
| JP | 2004-110267 | 4/2004 |
| JP | 2004-234402 | 8/2004 |

OTHER PUBLICATIONS

Hidehiko Okada et al.—"GUI Sekkei no Ikkansei o Hyoka suru Tool 'GUI Tester II' no Teian", IPSJ SIG Notes, Jul. 11, 1997, vol. 97, No. 63, pp. 7 to 12, p. 8, right column, lines 14 to 24, p. 10, right column, line 17 to p. 11, right column, line 7.

(Continued)

*Primary Examiner* — Tadeese Hailu
(74) *Attorney, Agent, or Firm* — Young & Thompson (57) ABSTRACT

A GUI evaluation system includes: an expression information extracting section for extracting an expression element on a plurality of evaluation target screens based on information capable of specifying a restriction on input into an input component; a data input expression specifying section for comparing respective expression elements extracted by the expression information extracting section among input components different in restriction on input to specify an expression element indicative of the restriction on input; and a data input expression determining section for determining that a restriction expression indicative of an input restriction is consistent when, among expression elements specified by the data input expression specifying section, there is a common expression element on the same input restriction on the plurality of evaluation target screens, or that a restriction expression indicative of an input restriction is inconsistent when there is no common expression element.

14 Claims, 10 Drawing Sheets

OTHER PUBLICATIONS

Atsushi Hashimoto et al.—"Kakucho Statechart o Machiita GUI Usability Jido Hyoka System", IPSJ SIG Notes, Sep. 21, 2002, vol. 2002, No. 91, pp. 91 to 98, p. 92, right column, line 29 to p. 93, left column, line 20.

International Search Report—PCT/JP2009/003825—Oct. 27, 2009.

Japanese Notification of Reasons for Refusal dated Jun. 28, 2011 in corresponding Japanese Application No. 2010-530694 with English translation of Japanese Notification of Reasons for Refusal.

Rohit Mahajan et al., Visual and Textual Consistency Checking Tools for Graphical User Interfaces, IEEE Transactions on Software Engineering, IEEE, Nov. 1997, Vol. 23, No. 11, pp. 722-735.

* cited by examiner

| SCREEN NAME | ITEM NAME | INDISPENSABLE/ OPTIONAL | RESTRICTION |
|---|---|---|---|
| WINDOW A | ITEM A1<br>ITEM A2<br>ITEM A3<br><br>ITEM A4 | INDISPENSABLE<br>INDISPENSABLE<br>INDISPENSABLE<br><br>OPTIONAL | FULL-PITCH<br><br>NUMBER OF CHARACTERS<br>(TEN CHARACTERS OR LESS) |
| WINDOW B | ITEM B1<br>ITEM B2<br><br>ITEM B3 | INDISPENSABLE<br>OPTIONAL<br><br>OPTIONAL | HALF-WIDTH JAPANESE<br>CHARACTER DISAPPROVED<br>YYYY/MM/DD |
| WINDOW C | ITEM C1<br>ITEM C2<br>ITEM C3<br>ITEM C4<br>ITEM C5 | INDISPENSABLE<br>OPTIONAL<br>OPTIONAL<br>OPTIONAL<br>OPTIONAL | NUMERIC VALUE (1-100)<br><br><br><br>FULL-PITCH |

| ITEM NAME | ITEM NAME ENDING | ITEM NAME CHARACTER COLOR | ITEM NAME BACKGROUND COLOR | ITEM NAME FONT | COMPONENT BACKGROUND COLOR | TEXT THAT FOLLOWS COMPONENT |
|---|---|---|---|---|---|---|
| ITEM A |   | #000000 | #FFFFFF | GOTHIC, 9pt | #EEEEEE |  |
| ITEM B | # | #000000 | #FFFFFF | GOTHIC, 9pt | #FFFFFF | (1-255) |
| ITEM C | (INDISPENSABLE) | #000000 | #FFFFFF | GOTHIC, 9pt | #EEEEEE |  |
| ITEM D |   | #000000 | #EEEEEE | GOTHIC, 9pt, BOLD | #FFFFFF |  |

WINDOW A

ITEM A1#: ▭
ITEM A2#: ▭
ITEM A3#: ▨
ITEM A4: ▭

[ OK ]  [ CANCEL ]

(A)

WINDOW B

ITEM B1# ▭
ITEM B2: ▨
ITEM B3: ▨

[ OK ]  [ CANCEL ]

INDISPENSABLE/OPTIONAL

| SCREEN NAME | DATA INPUT EXPRESSION (COMMON EXPRESSION) | OTHER EXPRESSIONS | PRESENCE OR ABSENCE OF EXPRESSION | CONSISTENCY |
|---|---|---|---|---|
| WINDOW A | ITEM NAME ENDING: # | ITEM BACKGROUND COLOR: #EEEEEE | ○ | ○ |
| WINDOW B | | ITEM BACKGROUND COLOR: #CCCCCC / ITEM CHARACTER COLOR: #FFFFFF | ○ | |

(A)

RESTRICTION

| SCREEN NAME | DATA INPUT EXPRESSION (COMMON EXPRESSION) | OTHER EXPRESSIONS | PRESENCE OR ABSENCE OF EXPRESSION | CONSISTENCY |
|---|---|---|---|---|
| WINDOW A | COMPONENT BACKGROUND COLOR: #EEEEEE | | ○ | ○ |
| WINDOW B | | | ○ | |

WINDOW A
- ITEM A1#: ▨▨▨▨
- ITEM A2#: ☐
- ITEM A3#: ▨▨▨▨
- ITEM A4: ☐

[ OK ]  [ CANCEL ]

(A)

WINDOW B
- ITEM B1#: ☐
- ITEM B2: ▨▨
- ITEM B3: ▨▨▨

[ OK ]  [ CANCEL ]

(B)

WINDOW C
- ITEM C1*: ☐
- ITEM C2: ☐
- ITEM C3: ☐
- ITEM C4: ☐
- ITEM C5: ☐

[ OK ]  [ CANCEL ]

INDISPENSABLE/OPTIONAL

| SCREEN NAME | DATA INPUT EXPRESSION (COMMON EXPRESSION) | OTHER EXPRESSIONS | PRESENCE OR ABSENCE OF EXPRESSION | CONSISTENCY | APPROPRIATENESS OF EXPRESSION |
|---|---|---|---|---|---|
| WINDOW A | | ITEM NAME ENDING:# ITEM BACKGROUND COLOR:#EEEEEE | ○ | | ○ |
| WINDOW B | | ITEM NAME ENDING:# ITEM BACKGROUND COLOR:#CCCCCC ITEM CHARACTER COLOR:#FFFFFF | ○ | | ○ |
| WINDOW C | | ITEM NAME ENDING:* | ○ | ×:ITEM C1 | !:ITEM C1 |

(A)

RESTRICTION

| SCREEN NAME | DATA INPUT EXPRESSION (COMMON EXPRESSION) | OTHER EXPRESSIONS | PRESENCE OR ABSENCE OF EXPRESSION | CONSISTENCY | APPROPRIATENESS OF EXPRESSION |
|---|---|---|---|---|---|
| WINDOW A | | COMPONENT BACKGROUND COLOR: #EEEEEE | ○ | | ○ |
| WINDOW B | | COMPONENT BACKGROUND COLOR: #EEEEEE | ○ | | ○ |
| WINDOW C | | | ○ | ×:ITEM C2, ITEM C5 | ×:ITEM C2, ITEM C5 |

GUI EVALUATION SYSTEM, GUI EVALUATION METHOD, AND GUI EVALUATION PROGRAM

TECHNICAL FIELD

The present invention relates to a GUI evaluation system, a GUI evaluation method and a GUI evaluation program for evaluating system usability, and particularly to a GUI evaluation system, a GUI evaluation method and a GUI evaluation program for evaluating the evaluation of the consistency of a description method in terms of restrictions on data input by a user.

BACKGROUND ART

A GUI (graphical user interface) is widely used as an interface used when a user inputs and outputs information into and from a computer system (hereinafter called a system). The GUI may be evaluated to evaluate system usability. An example of evaluating the GUI is to check, on a data entry screen provided by an evaluation target system the usability of which is to be evaluated, whether data input is indispensable or optional, check whether there is notation of restrictions on input characters (input character restrictions) in terms of the character attributes of an input text (such as character type like full-pitch/half-width and the number of characters), and check whether the notational conventions are standardized within the system. The evaluation criteria, including whether data input is indispensable or optional and the input character restrictions, are called "restrictions on data input."

When these evaluations are made manually, an evaluator checks for differences in expressions in input components and around the input components, speculates the expressions of input conditions from the results of giving various inputs, and checks whether the expressions are standardized on all screens to be evaluated. When the evaluation is made manually, its evaluation workload increases. In addition, there is a possibility that problems are overlooked. Note that the text input component is, for example, the display of a shape such as a rectangle displayed on an evaluation target screen, i.e., an area (text box) in which the user is urged to enter a text or the like.

There are known a GUI automatic evaluation device for automatically evaluating a GUI and a test conducting device (for example, see Patent Documents 1 and 2). The GUI automatic evaluation device described in Patent Document 1 inputs a screen designing guide and accumulates guide data as format rules. The device also accumulates, as information on the GUI, attribute information and attribute values for each window in a system to be evaluated. Then, the device checks the information on the GUI against the rules for each window and outputs the checking results. A means for generating the information on the GUI from the product specifications, a source program, a GUI building tool or the like is also described in Patent Document 1.

In the testing device described in Patent Document 2, an operation database (DB), a user sequence designated by a user when executing a test and a complementary sequence executed complementarily to execute the user sequence according to a procedure are stored. Then, when executing the user sequence according to the user sequence execution procedure, the device checks for the state of the GUI. When the user sequence cannot be executed, the operation DB is searched for an appropriate complementary sequence so that the user sequence will be executed after the complementary sequence is executed. The test conducting device described in Patent Document 2 can conduct a test for automatically performing a predetermined operational procedure.

A web screen creating tool, which is capable of checking for the appropriateness of a term or word on a web screen, is described in Patent Document 3. The web screen creating tool checks a source file of the web screen for homonyms, declensional Kana endings and synonyms of terms pre-registered as being likely to be misspelled. Specifically, when a registered term is detected on the web screen to be evaluated, alternatives to the term are displayed as a list.

CITATION LIST

Patent Literature

Patent Document 1 Japanese Patent Application Publication No. 8-241191
Patent Document 2 Japanese Patent Application Publication No. 2004-110267
Patent Document 3 Japanese Patent Application Publication No. 2004-234402

SUMMARY OF INVENTION

Technical Problem

When the GUI automatic evaluation device described in Patent Document 1 is employed, if the specifications or source program of a system to be evaluated cannot be acquired because the system is still in prototype stage or it is another company product, the evaluator will be required to write information on the GUI manually. If the work is done manually, the information on the GUI may not be created correctly. Even if the specifications are available, the specifications may include errors. In other words, correct evaluation may not be made unless an actually operating system to be evaluated is evaluated.

When the test conducting device described in Patent Document 2 is employed, it can be checked whether a predetermined user sequence can be executed normally, but it takes time to prepare for the sequence in response to the system to be evaluated. In addition, the GUI on which the sequence is executed or the sequence itself cannot be evaluated.

The web screen creating tool described in Patent Document 3 cannot evaluate the usability characteristics of terms other than unregistered ones.

It is desired to target an input component on which some restrictions are imposed, such as indispensable input, the character type and the number of characters, on a screen on which the user enters data in order to evaluate the presence or absence of information expressions indicating that input is indispensable, the presence or absence of information expressions indicating that a restriction is imposed thereon, and the consistency of the expressions. If the evaluation is made manually, the workload of the evaluator will increase. In addition, this makes a check omission more likely. The reasons therefor are as follows: When the presence of a restriction is shown on an evaluation target screen, some symbol (such as "#") may be assigned to an item name or the background color of the item name or the like may be changed, rather than directly writing a text such as "required" or "half-width Japanese character disapproved," due to limitations of space in the screen area. In other words, expressions differentiated from those indicating that input is optional or there is no restriction may be represented by a symbol or in a color scheme. In such a case, it is difficult for the evaluator to check for a difference in expression between input components in order to specify an expression on a restriction. Further, the evaluator himself has to extract an expression on indispensable input or the character type from each evaluation target screen and record the result.

Therefore, it is an object of the present invention to provide a GUI evaluation system, a GUI evaluation method and a GUI evaluation program capable of specifying information indicative of the presence of a restriction on data input on an evaluation target screen without any human operation in order to evaluate the consistency of data input expressions to input components on the evaluation target screen.

Solution to Problem

A GUI evaluation system according to the present invention is a GUI evaluation system for evaluating a restriction expression on data input into an input component on an evaluation target screen included in the evaluation system, comprising: an expression information extracting means for extracting an expression element on a plurality of evaluation target screens based on information capable of specifying a restriction on input into an input component; a data input expression specifying means for comparing respective expression elements extracted by the expression information extracting means among input components different in restriction on input to specify an expression element indicative of the restriction on input; and a data input expression determining means for determining that a restriction expression indicative of an input restriction is consistent when, among expression elements specified by the data input expression specifying means, there is a common expression element on the same input restriction on the plurality of evaluation target screens, or that a restriction expression indicative of an input restriction is inconsistent when there is no common expression element.

A GUI evaluation method according to the present invention is a GUI evaluation method for evaluating a restriction expression on data input into an input component on an evaluation target screen included in the evaluation system, comprising the steps of: extracting an expression element on a plurality of evaluation target screens based on information capable of specifying a restriction on input into an input component; comparing respective extracted expression elements among input components different in restriction on input to specify an expression element indicative of the restriction on input; and determining that a restriction expression indicative of an input restriction is consistent when, among expression elements specified by the data input expression specifying means, there is a common expression element on the same input restriction on the plurality of evaluation target screens, or that a restriction expressions indicative of an input restriction is inconsistent when there is no common expression element.

A GUI evaluation program making a computer in a GUI evaluation system, which evaluates a restriction expression on data input into an input component on an evaluation target screen included in the evaluation system, perform: expression information extracting processing for extracting an expression element on a plurality of evaluation target screens based on information capable of specifying a restriction on input into an input component; data input expression specifying processing for comparing respective expression elements extracted in the expression information extracting processing among input components different in restriction on input to specify an expression element indicative of the restriction on input; and data input expression determining processing for determining that a restriction expression indicative of an input restriction is consistent when, among expression elements specified in the data input expression specifying processing, there is a common expression element on the same input restriction on the plurality of evaluation target screens, or that a restriction expression indicative of an input restriction is inconsistent when there is no common expression element.

Advantageous Effects of the Invention

According to the present invention, the consistency of data input expressions to input components on an evaluation target screen can be evaluated without any human operation.

DESCRIPTION OF EMBODIMENTS

A specific exemplary embodiment of the present invention will now be described with reference to the accompanying drawings.

Figure 1:
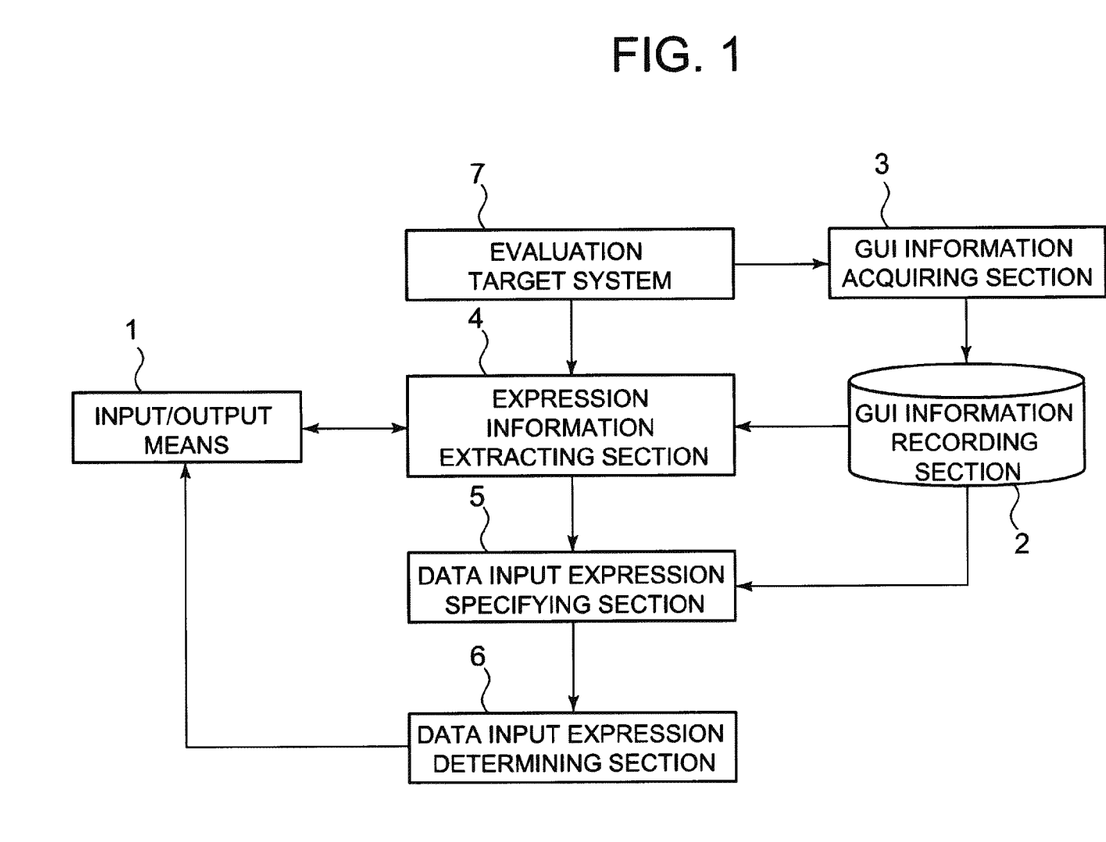
FIG. 1 It depicts a block diagram showing a configuration of a GUI evaluation system according to one preferred exemplary embodiment of the present invention.

FIG. 1 is a block diagram showing a configuration of a GUI evaluation system according to one preferred exemplary embodiment of the present invention together with a system to be evaluated. The GUI evaluation system shown in FIG. 1 includes an input/output means 1, a GUI information recording section 2, a GUI information acquiring section 3, an expression information extracting section 4, a data input expression specifying section 5 and a data input determination section 6.

The input/output means 1 includes an input means, such as a mouse and a keyboard, for entering information indicative of the content of operations performed by an evaluator, and an output means such as a display. The GUI information recording section 2 stores GUI information including the item name of each input component on an evaluation target screen, information on input indispensable/optional (i.e., information capable of specifying whether input is optional or indispensable) and restriction contents.

The GUI information acquiring section 3 acquires beforehand GUI information on a screen to be evaluated among screens displayed in an evaluation target system 6, and records the GUI information in the GUI information recording section 2. The GUI information recorded in the GUI information recording section 2 may be registered with the GUI information recording section 2 from a storage medium storing GUI information already generated, rather than being acquired from the evaluation target system 7.

The expression information extracting section 4 refers to the GUI information stored in the GUI information recording section 2 to extract, from an evaluation target screen in the evaluation target system 7, a phrase at the end of an item name, a color scheme of the item name, the kind of font, a input component color scheme, a text that follows the input component, etc., as expression information on each input component on the evaluation target screen. Then, the extracted expression information is output to the data input expression specifying section 5. Each of the phrase at the end of the item name, the color scheme of the item name, the kind of font, the input component color scheme, the text that follows the input component (text written after (on the right side of) the input component), etc. in the expression information is called an expression element, respectively. Specifically, the expression information extracting section 4 extracts an expression element of an item name included in the GUI information, an expression element in a text box corresponding to the item name, and an expression element such as text existing around the text box.

The data input expression specifying section 5 refers to the GUI information stored in the GUI information recording section 2 and the expression information input from the expression information extracting section 4 to make a paired comparison between pieces of expression information on input components different in indispensable/optional or the presence or absence of a restriction in order to extract a difference between the expression elements. Then, based on the extracted difference, an expression element indicative of an input restriction is specified. The specified information is included in the expression information and output as data input expression information to the data input expression determining section 6. In the exemplary embodiment, the paired comparison method is used as the comparison method, but any other comparison method may be used as long as it can specify information indicative of the presence of a restriction or the like.

The data input expression determining section 6 checks for the data input expression information input from the data input expression specifying section 5 in terms of the matter relating to indispensable/optional or whether there is a character input restriction, and when there is no data input expression common to the respective pieces of expression information, determines that there is a consistency problem, and outputs the determination result to the input/output means 1. Note that the "input expression" (or data input expression) means an expression (e.g., a mark or sign) representing a request to the user for something upon data input to an input component.

When there is a problem with the consistency of data input expressions, the data input expression determining section 6 further extracts, from the data input expression information, expression elements frequently used among plural input components determined to have a problem with consistency. Then, a most-used expression element is speculated as the data input expression indicative of indispensable/optional or the presence of a character input restriction. Based on the speculation result, an input component to which the speculated input expression is not applied is determined to be a portion in which test input is indispensable or there is a restriction but to which an appropriate data input expression may not be applied, and the determination result is output to the input/output means 1.

The expression information extracting section 4, the data input expression specifying section 5 and the data input expression determining section 6 is, for example, implemented by a CPU operating according to a program on a computer that realizes the GUI evaluation system.

The exemplary embodiment features that the expression information extracting section 4, the data input expression specifying section 5 and the data input expression determining section 6 are provided. The expression information extracting section 4 extracts expression elements relating to input components on an evaluation target screen. The data input expression specifying section 5 specifies, as data input expressions, expression elements indicative of the matter relating to indispensable/optional and the presence of a character input restriction. The data input expression determining section 6 evaluates consistency based on the presence or absence of common expression elements. When there is a problem with the consistency of data input expressions, the data input expression determining section 6 speculates a data input expression indicative of indispensable/optional or the presence of a character input restriction to specify an input component, to which the speculated data input expression is not applied, as an input component likely to have a problem, i.e., as an input component likely to lack the appropriateness of the expression.

Figure 2:
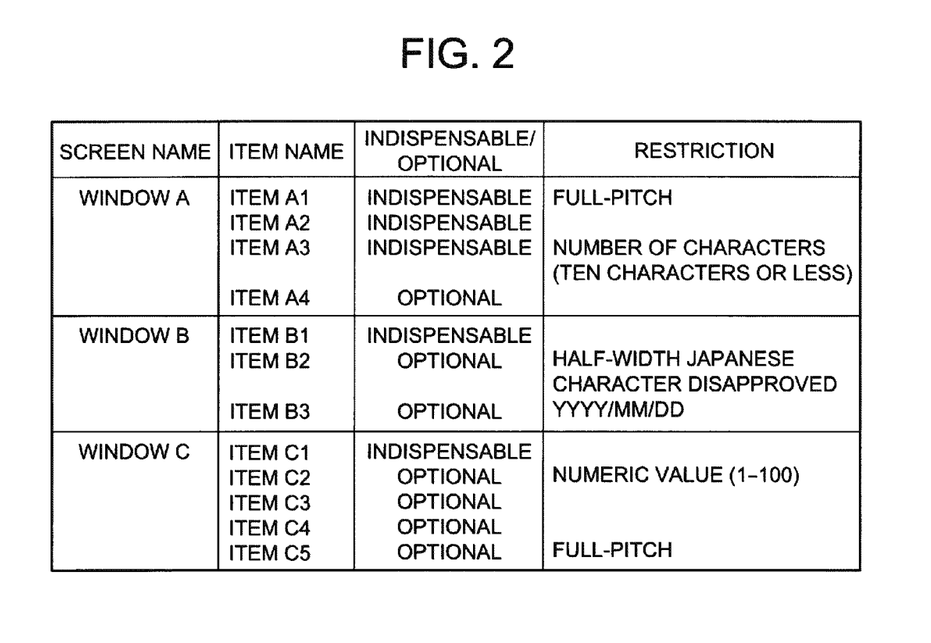
FIG. 2 It depicts an explanatory drawing showing an example of GUI information stored in a GUI information recording section.

FIG. 2 is an explanatory drawing showing an example of GUI information stored in the GUI information recording section 2. As shown in FIG. 2, the GUI information includes the screen names of screens to be evaluated, item names of input components in each screen, information indicating whether input is indispensable or not, and the contents of restrictions on data input.

In the example shown in FIG. 2, the input component of item A1 is an input component for which data input is indispensable and on which such a restriction that data should be entered in full-pitch characters is imposed exists in window A. The input component of item A2 is an input component for which data input is indispensable but the character attribute of the input data may be optional. The input component of item A3 is an input component on which such restrictions that data input is indispensable and data should be entered in ten characters or less are imposed. The input component of item A4 is an input component for which data input is optional and the character attribute of the input data may be optional. Note that blank columns in restriction columns that no restriction is imposed on text input to the item.

In window B, the input component of item B1 is an input component for which data input is indispensable but the character attribute of the input data may be optional. The input component of item B2 is an input component for which data input is optional but half-width Japanese character is not permitted as the character attribute of the input data. The input component of item B3 is an input component for which data input is optional but on which such a restriction that data should be entered in year-month-day format is imposed.

In window C, the input component of item C1 is an input component for which data input is indispensable but the character attribute of the input data may be optional. The input component of item C2 is an input component for which data input is optional but on which such a restriction that data should be entered as a numeric value within a range of 1 to 100 is imposed. The input component of item C3 is an input component for which data input is optional and the character attribute of the input data may be optional. The input component of item C4 is an input component for which data input is optional and the character attribute of the input data may be optional. The input component of item C5 is an input component for which data input is optional but on which such a restriction that data should be entered in full-pitch characters is imposed.

Figure 3:
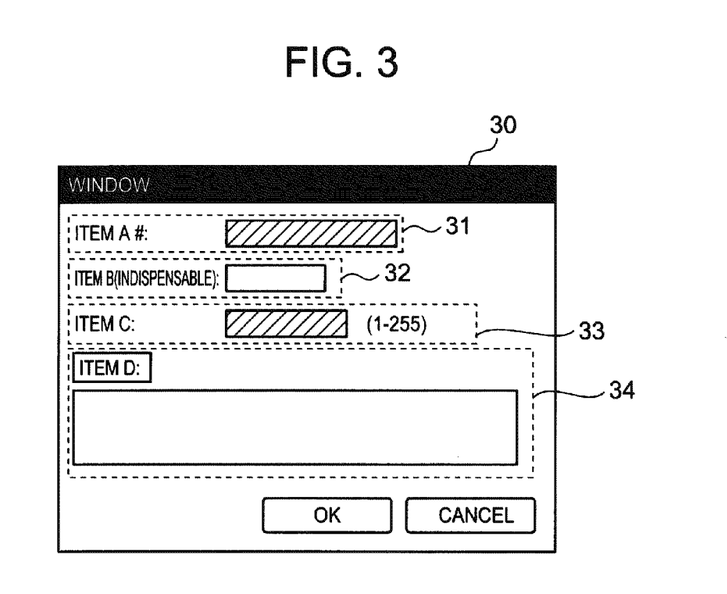
FIG. 3 It depicts an explanatory drawing showing an example of an evaluation target screen to describe expression information.
Figure 4:
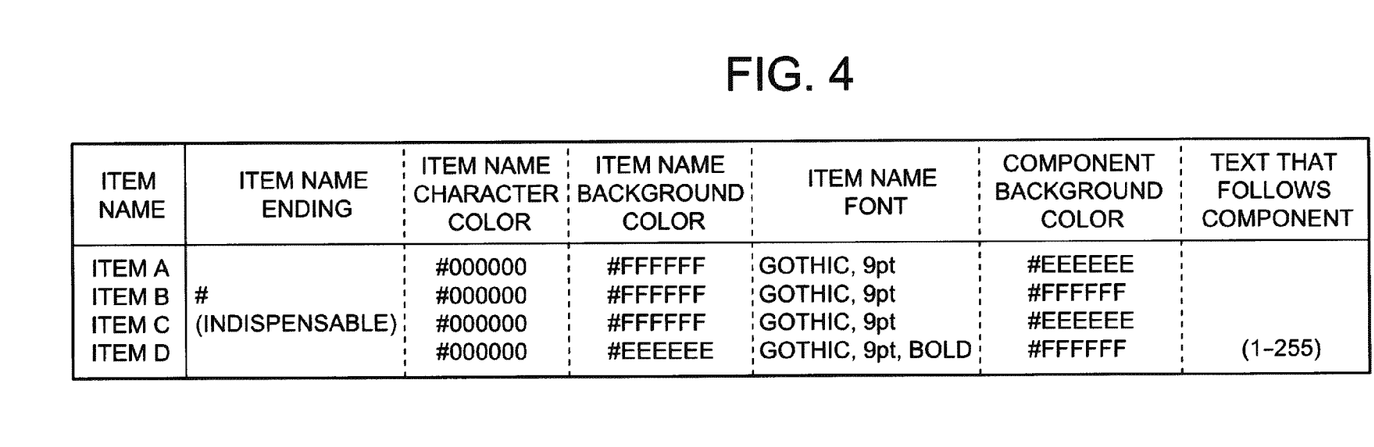
FIG. 4 It depicts an explanatory drawing showing an example of expression information extracted by an expression information extracting section.

FIG. 3 is an explanatory drawing showing an example of the evaluation target screen to describe expression information. FIG. 4 is an explanatory drawing showing an example of expression information extracted by the expression information extracting section 4 from the evaluation target screen illustrated in FIG. 3. In the example shown in FIG. 3, four input components and expressions (text) of item names corresponding to these input components exist in a window 30. Expressions (text) of advisory notes also exist on the right side of items A and C. Note that "itemD:" is boxed and this denotes that the background color of "itemD:" is different from the background color of the other item names.

The GUI evaluation system targets the four input components in the window 30 to check for an item name located on the left side of or above each input component and the presence of absence of text (right-hand text) that follows the input component. Then, information on the text and color schemes in rectangular areas 31 to 34 including the item names, the input components and text that follows the input components is acquired as expression information. As shown in FIG. 4, the expression information includes trailing text of the item names (trailing characters of the item names), color schemes of the item names (item name character colors and item name background colors), fonts of the item names, input component color schemes (input component background colors, i.e., background colors of the input components) and text that follows the input components.

In the example shown in FIG. 3, all item name character colors are the same (e.g., black) and the item name background colors of the items A to C are the same (e.g., white), but the item name background color of the item D is different from the item name background color of the items A to C. In FIG. 3, the background color of the rectangle that encloses or boxes "item D:" is different from the item name background color of the items A to C. Further, the input component background color of the items A and C (the color scheme applied to the input components) is different from the input component background color of the items B and D. For example, the input component background color of the items B and D is white and the input component background color of the items A and C is a color other than white.

Figure 5:
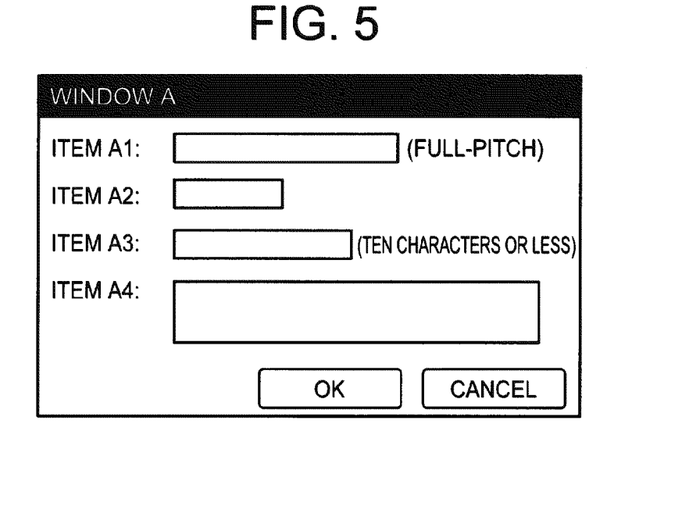
FIG. 5 It depicts an explanatory drawing showing an example of an evaluation target screen in a system to be evaluated.
Figure 6:
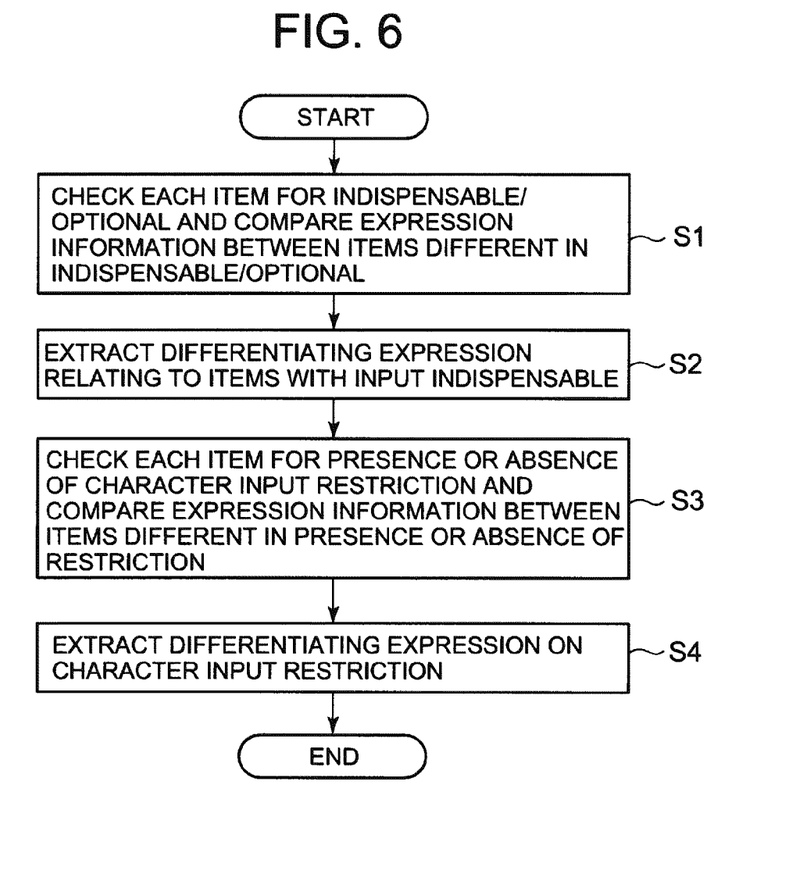
FIG. 6 It depicts a flowchart showing the operation of a data input expression specifying section and a data input expression determining section.

Next, as a first specific example, processing performed by the data input expression specifying section 5 and the data input expression determining section 6 to specify a data input expression indicative of indispensable/optional or the presence or absence of a character input restriction and determine the presence or absence of a data input expression will be described with reference to an explanatory drawing of FIG. 5 and a flowchart of FIG. 6. Here, a case is taken as an example in which window A shown in FIG. 5 is the evaluation target screen. The GUI information is as shown in FIG. 2. In other words, the GUI information on window A illustrated in FIG. 2 corresponds to the GUI information extracted from window A shown in FIG. 5.

The data input expression specifying section 5 refers to the GUI information (see FIG. 2) stored in the GUI information recording section 2 to check window A shown in FIG. 5 for indispensable/optional of item A1 to item A4. In other words, it is checked whether data input is indispensable or optional. Then, the data input expression specifying section 5 compares pieces of expression information on items different in indispensable/optional (step S1).

In the comparison between the pieces of expression information on indispensable/optional, the data input expression specifying section 5 first compares the expression information on item A1 (indispensable) with the expression information on item A4 (optional). As a result of the comparison, "text that follows the input component" ("full-pitch" in this example) is extracted as a difference in expression information (step S2). Thus, it is determined that there is a data input expression relating to indispensable/optional.

Next, the expression information on item A2 (indispensable) and the expression information on item A4 (optional) are compared. As a result of the comparison, no difference in expression information is extracted. Though data input into item A2 is indispensable and data input into item A4 is optional, since there is no difference in expression information, the data input expression determining section 6 determines that any differentiating expression indicating whether input is indispensable or optional is not applied to the respective input components in window A.

Next, the data input expression specifying section 5 checks for the presence or absence of restrictions on item A1 to item A4. Then, it compares pieces of expression information (see FIG. 2) on items different in the presence or absence of restrictions (step S3). First, the expression information on item A1 (restricted) and the expression information on item A2 (unrestricted) are compared. As a result of the comparison, "text that follows the input component" ("full-pitch" in this example) is extracted as a difference in expression information. Next, the pieces of expression information on item A1 (restricted) and item A4 (unrestricted) are compared. As a result of the comparison, "text that follows the input component" is extracted as a difference in expression information. Similarly, the expression information on item A2 (unrestricted) and the expression information on item A3 (restricted) are compared, and the expression information on item A3 (restricted) and the expression information on item A4 (unrestricted) are compared. As a result of the comparisons, "text that follows the input component" ("ten characters or less" in this example) is extracted as a difference in expression information (step S4).

Based on the results of the above-mentioned processing for extracting differences in expression information, the data input expression determining section 6 determines that the "text that follows the input component" extracted in common as the results of all the paired comparisons is a data input expression on a character input restriction for the input components in window A.

If a screen with no items different in restriction on data input is targeted for evaluation, such as a case where data input into all input components is indispensable or data input into all input components is optional, all the expression elements will be specified as data input expressions indicative of indispensable or optional.

The above-mentioned processing is so performed that the presence or absence of data input expressions on the evaluation target screen can be evaluated. In this specific example, as a data input expression determining method in terms of restrictions on data input, pieces of expression information are compared based on differences in presence or absence of restrictions to extract differentiating expressions as differences in expression information, and a common expression ("text that follows the input component" in the above example) is specified as a data input expression (restriction). However, the expressions may be subdivided by restriction type (character type, numeric value, the number of characters, etc.) instead of the presence or absence of a restriction so that the expression information will be compared based on a difference in type to determine the presence or absence of each type expression.

Figure 7:
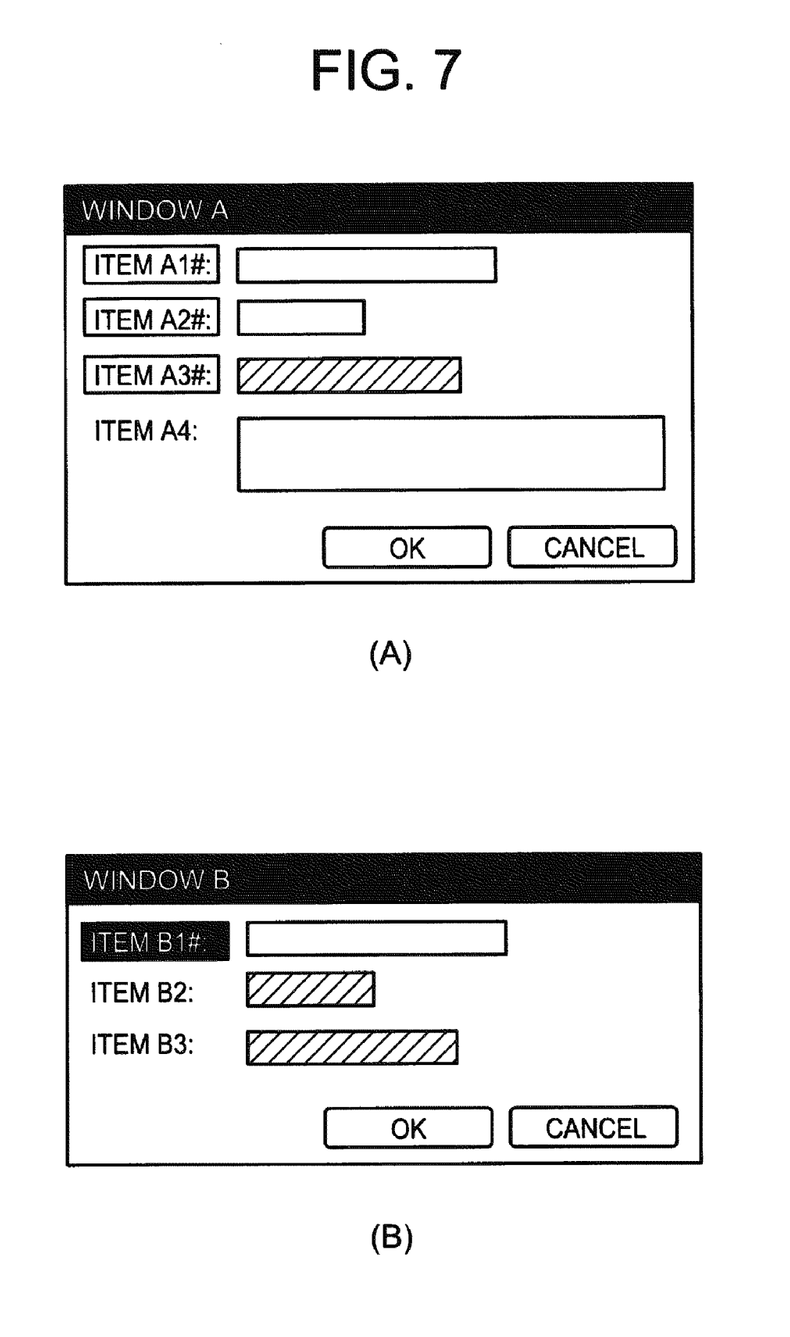
FIG. 7 It depicts an explanatory drawing showing an example of two or more evaluation target screens in the system to be evaluated.
Figure 8:
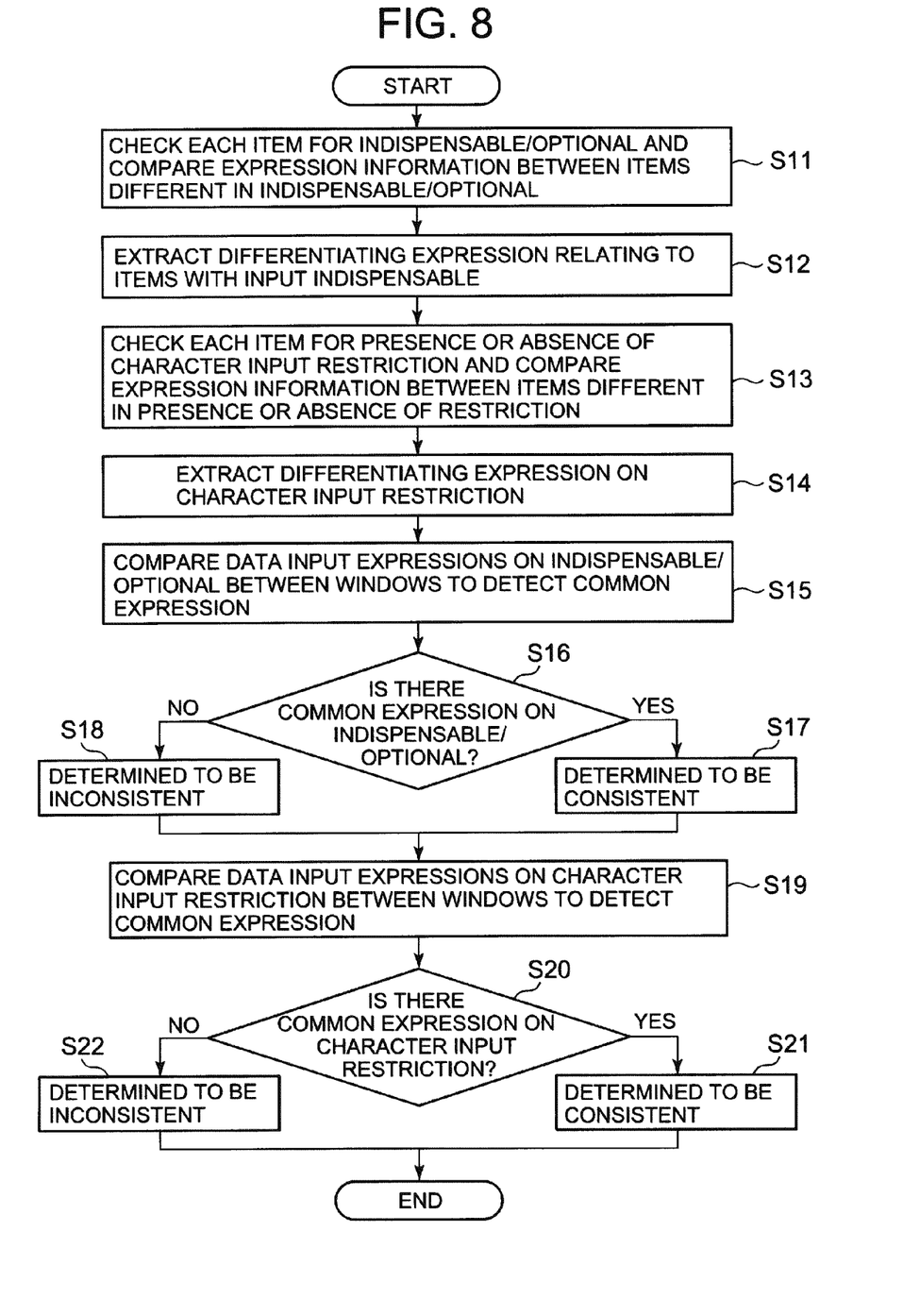
FIG. 8 It depicts a flowchart showing the operation of the data input expression specifying section and the data input expression determining section.

Next, as a second specific example, processing performed by the data input expression specifying section 5 and the data input expression determining section 6 to specify a data input expression indicative of indispensable/optional or a data input expression indicative of the presence or absence of a character input restriction, and determine the consistency of expressions between two or more windows will be described with reference to an explanatory drawing of FIG. 7 and a flowchart of FIG. 8. Here, a case is taken as an example in which window A and window B shown in FIG. 7 are the evaluation target screens. The GUI information is as shown in FIG. 2. In other words, the GUI information on windows A and B illustrated in FIG. 2 corresponds to GUI information extracted from window A and window B shown in FIG. 7.

In window A illustrated in FIG. 7 (A), "item A1 #:," "item A2 #:" and "item A3 #:" are boxed, and this denotes that the background color thereof (corresponding to (#EEEEEE) in FIG. 2) is different from the background color of "item A4:." Further, the input component background color of items A1 and A3 is different from the input component background color of items A2 and A4. In window B illustrated in FIG. 7 (B), the background color of "item B1 #:" (corresponding to (#CCCCCC) in FIG. 2) is different from the background color of "item B2 #:" and "item B3 #:." For example, the item name character color of "item B1 #:" is white (corresponding to (#FFFFFF) in FIG. 2), which is different from the item name character color of "item B2 #:" and "item B3 #:." Further, the input component background color of items B2 and B3 is different from the input component background color of item B1.

It is assumed that there is a predetermined association between window A and window B to be displayed by the evaluation target system 7. As an example, suppose that window A and window B are an application form for a business trip and the form of a report about a business trip on the same business, respectively.

Like in the first specific example, the data input expression specifying section 5 targets window A and window B shown in FIG. 7 to specify data input expressions in each window while referring to the GUI information (see FIG. 2) stored in the GUI information recording section 2 (steps S11 to S14).

When window A and window B shown in FIG. 7 are targeted, data input expressions corresponding to the fact that data input is indispensable in window A are "item name ending" (symbol # and "item name background color" (#EEEEEE), while data input expressions corresponding to the fact that data input is indispensable in window B are "item name ending" (symbol #, "item name background color" (#CCCCCC) and "item name character color" (#FFFFFF).

Figure 9:
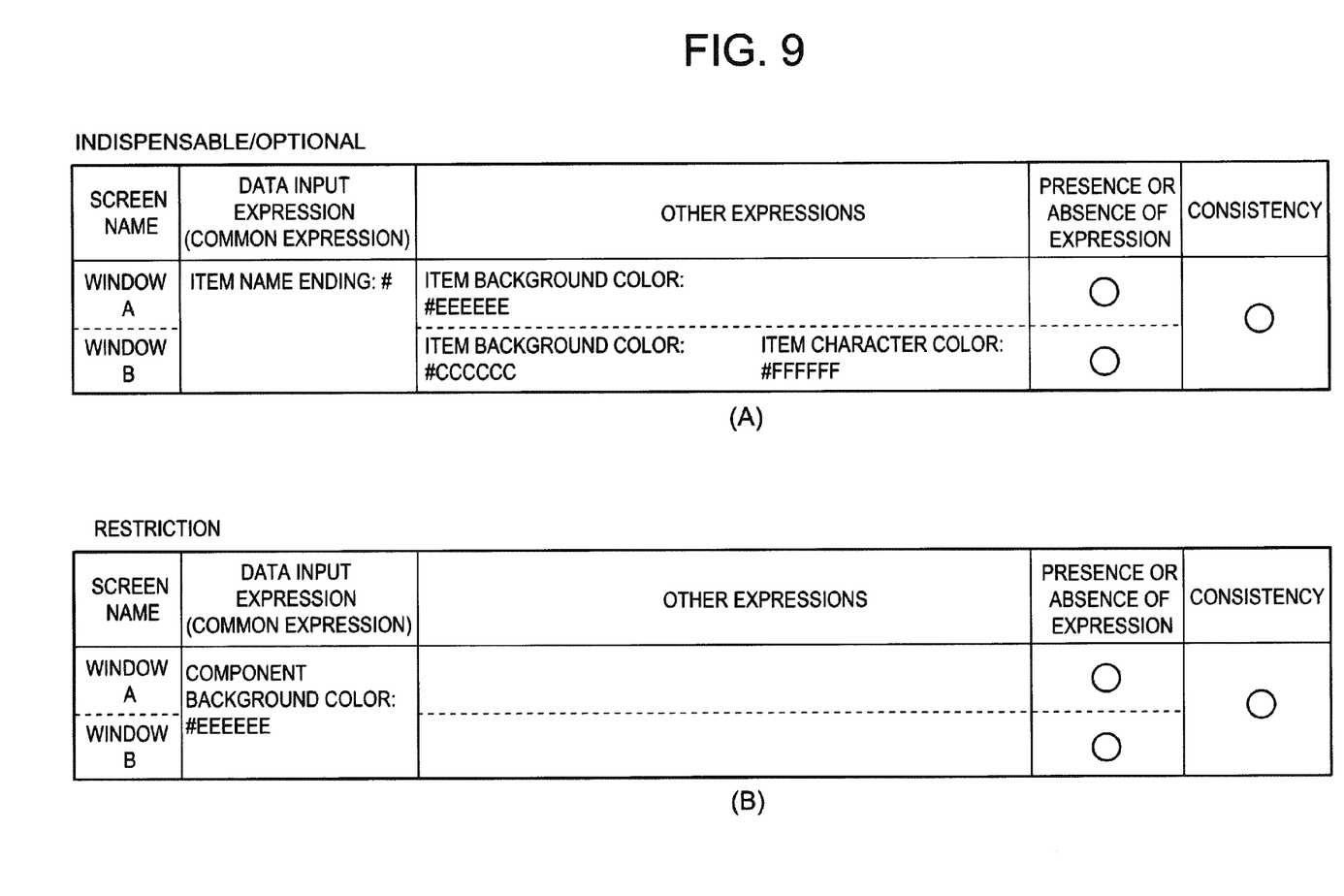
FIG. 9 It depicts an explanatory drawing showing determination results obtained by the data input expression determining section.

FIG. 9 is an explanatory drawing showing the determination results obtained by the data input expression determining section 6. FIG. 9 (A) shows the determination results on indispensable/optional, and FIG. 9 (B) shows the determination results on character input restrictions. As shown in FIG. 9, since some data input expressions corresponding to the fact that data input is indispensable and some data input expressions corresponding to the fact that there is a character input restriction exist in window A and window B, respectively, the data input expression determining section 6 determines that there is no problem with the presence or absence of data input expressions (see the column "Presence or Absence of Expression" in FIG. 9).

Further, when the data input expression determining section 6 checks that data input expressions indicating that data input is indispensable exist in window A and window B, it compares window A and window B in terms of data input expressions on indispensable/optional to detect a common expression on indispensable/optional (step S15). When window A and window B shown in FIG. 7 are targeted, a common expression can be extracted as a result of the comparison. In other words, "item name ending" (symbol #) commonly applied to items for which input is indispensable in window A and window B is specified as the overall data input expression (indispensable) in an evaluation target screen group (window A and window B in this example).

Since a common expression exists, the data input expression determining section 6 determines that there is no problem (○) with the consistency of data input expressions on indispensable/optional in each window (steps S16 and S17: see the column "Consistency" in FIG. 9 (A)). It also determines that there is no problem (○) with the appropriateness of data input expressions on indispensable/optional in each window (see the column "Appropriateness of Expression" in FIG. 9 (A)). When no common expression exists, the data input expression determining section 6 determines that the data input expressions are inconsistent (steps S16 and S18).

When data input expressions in window A and window B are compared in terms of the presence or absence of a character input restriction to detect a common expression on the presence of absence of a character input restriction (step S19), if window A and window B shown in FIG. 7 are targeted, a common expression can be extracted as a result of the comparison. In other words, "input component background color" (#EEEEEE) as an expression commonly applied to corresponding items in window A and window B is specified as a data input expression on the presence or absence of a restriction. The data input expression determining section 6 starts comparison processing for detecting a common expression on the presence or absence of a character input restriction on condition that it checks that data input expressions on the presence or absence of a character input restriction exist in window A and window B.

Since a common expression exists, the data input expression determining section 6 determines that there is no problem (○) with the consistency of data input expressions on the presence or absence of a character input restriction in each window (steps S20 and S21: see the column "Consistency" in FIG. 9 (B)). It also determines that there is no problem (○) with the appropriateness of data input expressions on the presence or absence of a character input restriction in each window (see the column "Appropriateness of Expression" in FIG. 9 (B)). When no common expression exists, the data input expression determining section 6 determines that the data input expressions are inconsistent (steps S20 and S22).

Figure 10:
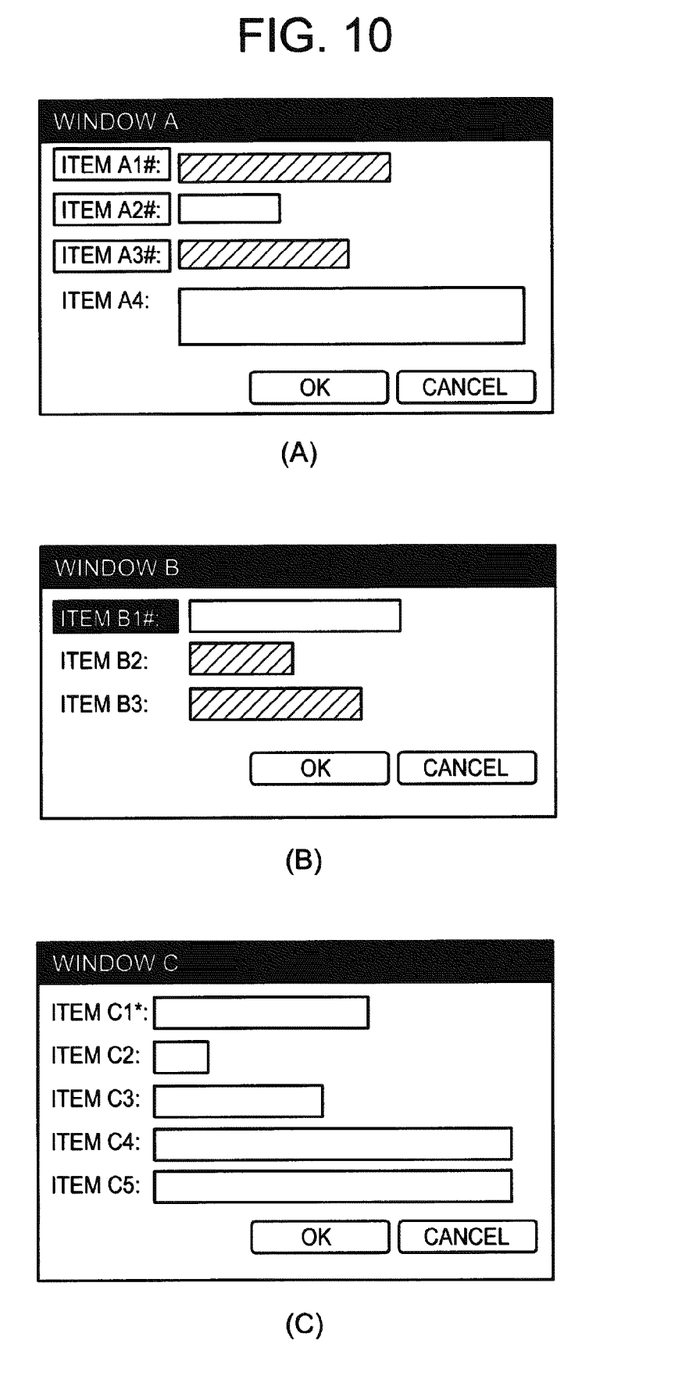
FIG. 10 It depicts an explanatory drawing showing an example of two or more evaluation target screens in the system to be evaluated.

Next, still another example of processing performed by the data input expression specifying section 5 and the data input expression determining section 6 to specify a data input expression indicative of indispensable/optional or a data input expression indicative of the presence or absence of a character input restriction, and determine the consistency of expressions between two or more windows will be described. An example to be described below is called a third specific example. Here, a case is taken as an example in which window A, window B and window C shown in FIG. 10 are the evaluation target screens. The GUI information is as shown in FIG. 2. In other words, the GUI information on windows A, B and C illustrated in FIG. 2 correspond to GUI information extracted from window A, window B and window C shown in FIG. 10. In the third specific example, the data input expression specifying section 5 and the data input expression determining section 6 also perform processing shown in the flowchart of FIG. 8.

It is also assumed that window C displayed by the evaluation target system 7 is associated with window A and window B in a predetermined manner.

Like in the first specific example, the data input expression specifying section 5 refers to the GUI information (see FIG. 2) stored in the GUI information recording section 2 to specify data input expressions in each window (steps S11 to S14).

When windows A, B and C shown in FIG. 10 are targeted, a data input expression corresponding to the fact that data input is indispensable in window C is "item name ending" (symbol *). In other words, the data input expression specifying section 5 specifies "item name ending" (symbol *) as the data input expression corresponding to the fact that data input is indispensable in window C.

Figure 11:
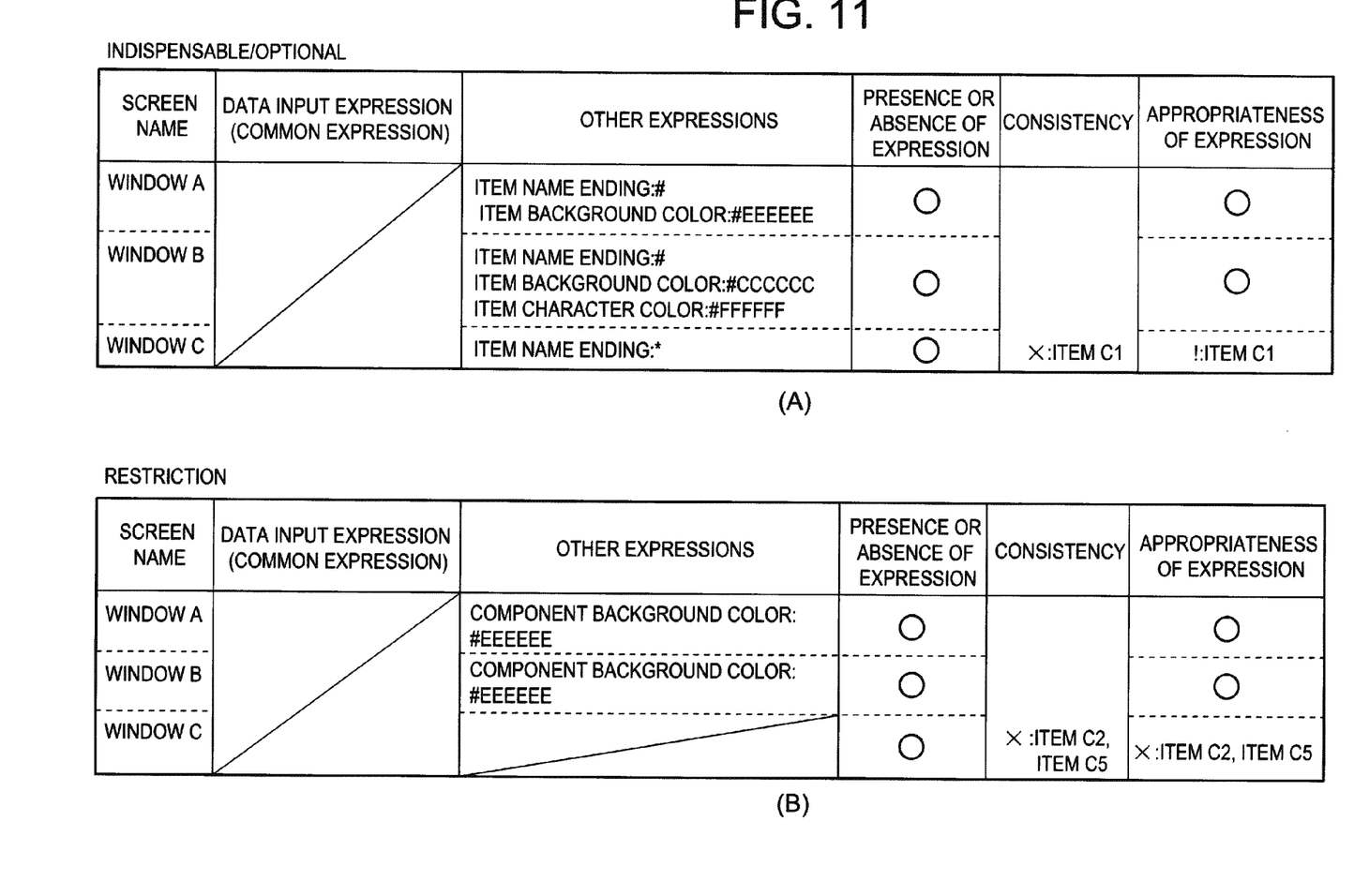
FIG. 11 It depicts an explanatory drawing showing determination results obtained by the data input expression determining section.

FIG. 11 is an explanatory drawing showing the determination results obtained by the data input expression determining section 6. FIG. 11 (A) shows the determination results on indispensable/optional, and FIG. 11 (B) shows the determination results on character input restrictions. As shown in FIG. 11, since some data input expressions corresponding to the fact that data input is indispensable and some data input expressions corresponding to the fact that there is character input restrictions exist in windows A, B and C, respectively, the data input expression determining section 6 determines that there is no problem with the presence or absence of data input expressions (see the column "Presence or Absence of Expression" in FIG. 11).

However, there is no common data input expression in all windows A, B and C in both the case where data input expressions on indispensable/optional are compared among windows A, B and C and the case where data input expressions on a character input restriction are compared among windows A, B and C. Therefore, the data input expression determining section 6 determines that there is a problem (x) with the consistency of data input expressions on indispensable/optional and there is a problem (x) with the consistency of data input expressions on a character input restriction (steps S15, S16, S18 and steps S19, S20, S22).

The data input expression determining section 6 extracts a most-used expression among five items existing across all windows A, B and C and for which input is indispensable at the point of determining that there is a consistency problem. In this example, "item name ending" (symbol #, the number of uses is four) is extracted. Therefore, the data input expression determining section 6 speculates "item name ending" (symbol #) as a data input expression indicating that data input is indispensable. In other words, the data input expression determining section 6 determines that it is a data input expression (optimum restriction expression) to be recommended as a data input expression (data input expression indicating that data input is indispensable) common to windows A, B and C.

Further, the data input expression determining section 6 determines that there is no problem (○) with the appropriateness of expressions in windows A and B using "item name ending" (symbol #) and that the appropriateness of expressions in window C using "item name ending" (symbol *) as a different expression should be set to warning (!). Then, the data input expression determining section 6 outputs information indicating that it should be warned and a corresponding item name (item C1) (which is preferred to be modified) (see FIG. 11 (A)). In other words, based on the speculation result on the common data input expression, an input component to which the speculated input expression is not applied is determined to be a portion to which an appropriate data input expression to indicate that data input is indispensable may not be applied, and the determination result is output.

Further, the data input expression determining section 6 extracts a most-used expression among six items existing across all windows A, B and C and imposing restrictions on data input. In this example, "input component background color" (#EEEEEE) is extracted. Therefore, the data input expression determining section 6 determines "input component background color" (#EEEEEE) to be a data input expression to be recommended as a data input expression (data input expression indicating that there is a restriction) common to windows A, B and C. In other words, the data input expression determining section 6 determines that it is a data input expression (optimum restriction expression) to be recommended as a data input expression (data input expression indicating that there is a restriction) common to windows A, B and C.

Further, the data input expression determining section 6 determines that there is no problem (○) with the appropriateness of expressions in windows A and B using "input component background color" (#EEEEEE) and that there is a problem (x) with the appropriateness of expressions in window C having no data input expression on a character input restriction. Then, the data input expression determining section 6 outputs information indicating that there is a problem and corresponding item names (item C2, item C5) (it is preferred that data expressions be added thereto) (see FIG. 11 (B)). In other words, based on the speculation results on the common data input expressions, input components to which the speculated input expressions are not applied are determined to be portions to which appropriate data input expressions on character input restrictions may not be applied, and the determination results are output.

As described above, the GUI evaluation system of the exemplary embodiment specifies a data input expression on indispensable/optional or the presence or absence of a restriction for each individual input component on an evaluation target screen, and compares data input expressions among two or more screens so that the presence or absence of a common expression element can be checked. Further, when there is no common expression element, a frequently-used expression element is presumed to be a data input expression, and a portion(s) in which the data input expression is not used is specified.

As a result, the presence or absence of data input expressions indicative of indispensable/optional or the presence or absence of character input restrictions and the consistency of data input expressions in input components on two or more evaluation target screens can be evaluated. Further, if there is no common data input expression across all the evaluation target screens and hence it is determined that there is a problem with consistency, a relatively frequently-used expression is presumed to be a data input expression, so that an item(s) that does not use the data input expression can be presented as a portion(s) in which there is a problem (a portion(s) desired to be modified).

Figure 12:
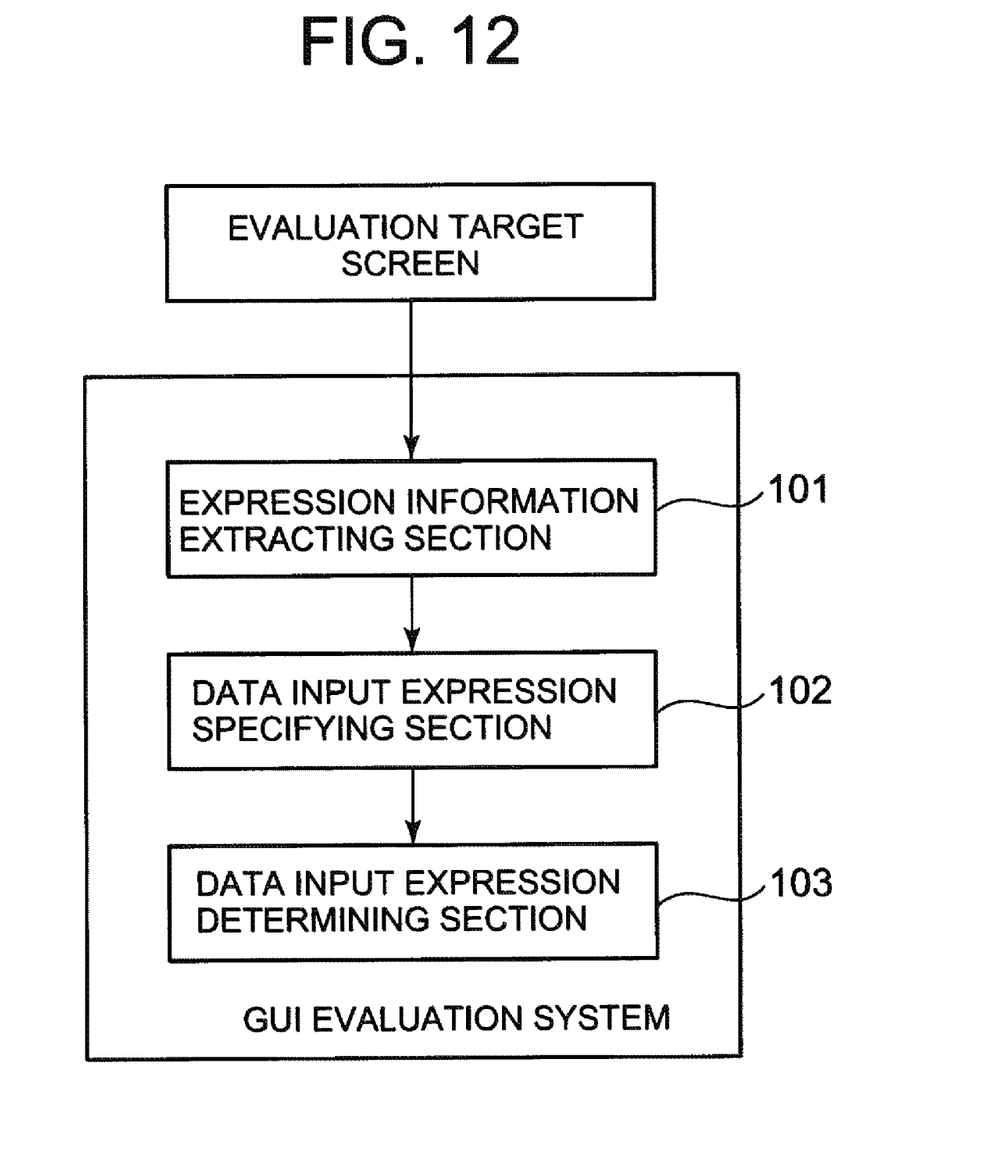
FIG. 12 It depicts a block diagram showing main sections of the GUI evaluation system according to the present invention.

FIG. 12 is a block diagram showing main sections of the GUI evaluation system according to the present invention. As shown in FIG. 12, the GUI evaluation system includes an expression information extracting section 101 (corresponding to the expression information extracting section 4 shown in FIG. 1) for extracting an expression element on two or more evaluation target screens based on information (e.g., GUI information) capable of specifying restrictions on input into input components, a data input expression specifying section 102 (corresponding to the data input expression specifying section 5 shown in FIG. 1) for comparing respective expression elements extracted by the expression information extracting section 101 among input components different in input restriction to specify an expression element indicative of an input restriction, and a data input expression determining section 103 (corresponding to the data input expression determining section 6 shown in FIG. 1) for determining that restriction expressions indicative of input restrictions are consistent when, among expression elements specified by the data input expression specifying section 102, there is a common expression element on the same input restriction on two or more evaluation target screens, or that restriction expressions indicative of input restrictions are inconsistent when there is no common expression element.

While the invention is described with reference to the exemplary embodiment and examples, the invention is not intended to be limited to the aforementioned exemplary embodiment and examples. Various changes that will be appreciated by those skilled in the art can be made to the configurations and details of the invention within the scope of the invention.

This application claims priority based upon Japanese Patent Application No. 2008-251808 filed Sep. 29, 2008, which is incorporated by reference herein in its entirety.

INDUSTRIAL APPLICABILITY

The present invention is preferably applicable to applications for evaluating system usability.

REFERENCE SIGNS LIST

1 Input/Output Means
2 GUI Information Recording Section
3 GUI Information Acquiring Section
4 Expression Information Extracting Section
5 Data Input Expression Specifying Section
6 Data Input Expression Determining Section
7 System to Be Evaluated
30 Window
31 to 34 Rectangular Area
101 Expression Information Extracting Section
102 Data Input Expression Specifying Section
103 Data Input Expression Determining Section

The invention claimed is:

1. A GUI evaluation system for evaluating a restriction expression on data input into an input component on an evaluation target screen included in the evaluation system, comprising:
an expression information extracting section for extracting an expression element on a plurality of evaluation target screens based on information capable of specifying a restriction on input into an input component;
a data input expression specifying section for comparing respective expression elements extracted by the expression information extracting section among input components different in restriction on input to specify an expression element indicative of the restriction on input; and
a data input expression determining section for determining that a restriction expression indicative of an input restriction is consistent when, among expression elements specified by the data input expression specifying section, there is a common expression element on the same input restriction on the plurality of evaluation target screens, or that a restriction expression indicative of an input restriction is inconsistent when there is no common expression element.

2. The GUI evaluation system according to claim 1, wherein when an expression element specified as the expression element on an input restriction exists on the respective evaluation target screens, the data input expression determining section determines whether a common expression element on the input restriction exists.

3. The GUI evaluation system according to claim 1, wherein when determining inconsistency, the data input expression determining section determines most-used expression information among the expression elements on the same input restriction to be an optimal restriction expression indicative of the input restriction, and input components that do not correspond to the expression information to be inappropriate in terms of the restriction expressions.

4. The GUI evaluation system according to claim 3, wherein the data input expression determining section outputs information indicative of input components that do not correspond to the expression information determined to be the optimal restriction expression.

5. The GUI evaluation system according to claim 1, further comprising
a restriction information recording section for storing information capable of specifying a restriction on input into an input component,
wherein the expression information extracting section refers to the information stored in the restriction information recording section to extract an expression element from an evaluation target screen.

6. The GUI evaluation system according to claim 5, wherein the expression information extracting section extracts an expression element of an item name included in the information stored in the restriction information recording section, an expression element of a text box corresponding to the item name, and an expression element of text existing around the text box.

7. A GUI evaluation method for evaluating a restriction expression on data input into an input component on an evaluation target screen included in the evaluation system, comprising:
extracting an expression element on a plurality of evaluation target screens based on information capable of specifying a restriction on input into an input component;
comparing respective extracted expression elements among input components different in restriction on input to specify an expression element indicative of the restriction on input; and
determining that a restriction expression indicative of an input restriction is consistent when, among specified expression elements, there is a common expression element on the same input restriction on the plurality of evaluation target screens, or that a restriction expression indicative of an input restriction is inconsistent when there is no common expression element.

8. The GUI evaluation method according to claim 7, wherein when an expression element specified as the expression element on an input restriction exists on the respective evaluation target screens upon determining the consistency of restriction expressions, it is determined whether a common expression element on the input restriction exists.

9. The GUI evaluation method according to claim 7, wherein when the restriction expressions are determined to be inconsistent, most-used expression information among the expression elements on the same input restriction is determined to be an optimal restriction expression indicative of the input restriction, and input components that do not correspond to the expression information are determined to be inappropriate in terms of the restriction expressions.

10. The GUI evaluation method according to claim 9, wherein information indicative of input components that do not correspond to the expression information determined to be the optimal restriction expression is output.

11. A GUI evaluation program making a computer in a GUI evaluation system, which evaluates a restriction expression on data input into an input component on an evaluation target screen included in the evaluation system, perform:
  expression information extracting processing for extracting an expression element on a plurality of evaluation target screens based on information capable of specifying a restriction on input into an input component;
  data input expression specifying processing for comparing respective expression elements extracted in the expression information extracting processing among input components different in restriction on input to specify an expression element indicative of the restriction on input; and
  data input expression determining processing for determining that a restriction expression indicative of an input restriction is consistent when, among expression elements specified in the data input expression specifying processing, there is a common expression element on the same input restriction on the plurality of evaluation target screens, or that a restriction expression indicative of an input restriction is inconsistent when there is no common expression element.

12. The GUI evaluation program according to claim 11, wherein when an expression element specified in the data input expression determining processing as the expression element on an input restriction exists on the respective evaluation target screens, making the computer perform to determine whether a common expression element on the input restriction exists.

13. The GUI evaluation program according to claim 11, wherein when inconsistency is determined in the data input expression determining processing, making the computer perform appropriateness determination processing for determining most-used expression information among the expression elements on the same input restriction to be an optimal restriction expression indicative of the input restriction, and input components that do not correspond to the expression information to be inappropriate.

14. The GUI evaluation program according to claim 13, making the computer perform output processing for outputting information indicative of input components that do not correspond to the expression information determined to be the optimal restriction expression.

* * * * *